L. M. PYLE
CLUTCH MECHANISM.
APPLICATION FILED OCT. 15, 1919.
1,345,633.
Patented July 6, 1920.
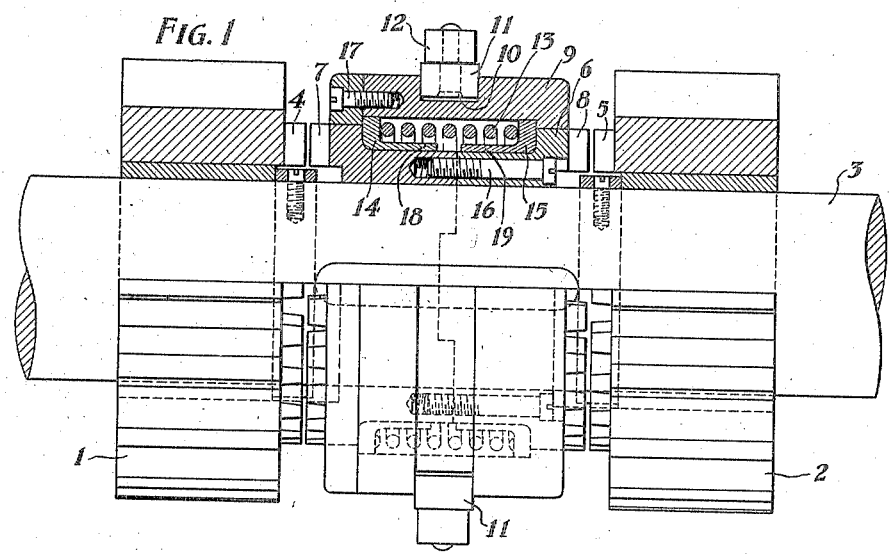
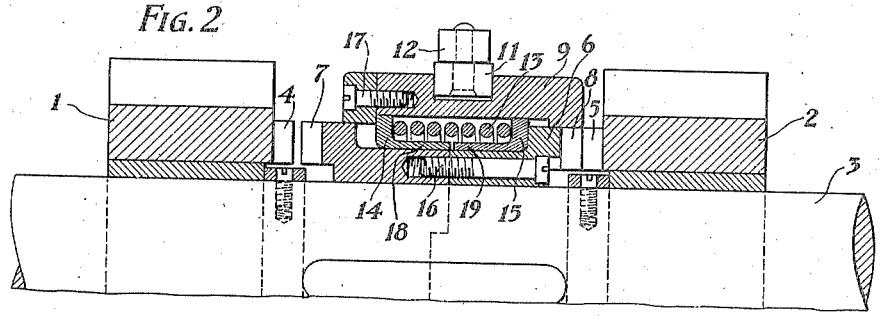
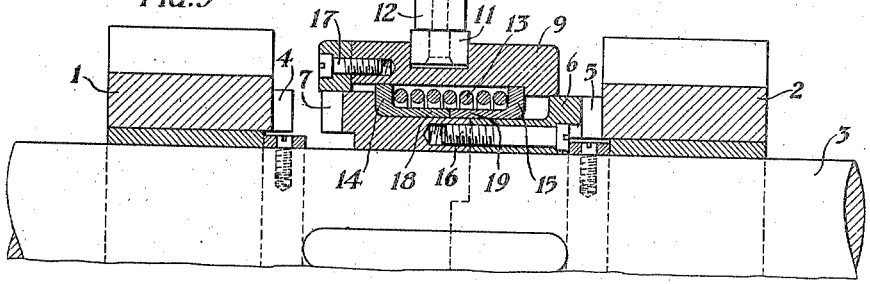
Inventor
Lewis M. Pyle
By S. Jay Teller
Attorney

UNITED STATES PATENT OFFICE.

LEWIS M. PYLE, OF BRYN MAWR, PENNSYLVANIA, ASSIGNOR TO NILES-BEMENT-POND CO., OF NEW YORK, N. Y., A CORPORATION OF NEW JERSEY.

CLUTCH MECHANISM.

1,345,633.  Specification of Letters Patent.  Patented July 6, 1920.

Application filed October 15, 1919. Serial No. 330,821.

*To all whom it may concern:*

Be it known that I, LEWIS M. PYLE, a citizen of the United States, residing at Bryn Mawr, in the county of Montgomery and State of Pennsylvania, have invented certain new and useful Improvements in Clutch Mechanisms, of which the following is a specification.

The invention relates particularly to double-acting toothed clutch mechanisms. One of the objects of the invention is to provide an improved clutch mechanism having a compact structure which is concentric with the main power shaft and which includes a spring so arranged that it serves to permit the immediate movement of the operating member to an extreme position, even though the teeth are not in position to engage, and subsequently serves to bring the clutch teeth into engagement as soon as they come into the proper position. A further object of the invention is to provide a clutch mechanism of the type specified having means whereby a positive connection is formed between the driven element of the clutch and the operating member which serves to positively disengage the teeth when the operating member is returned to neutral position. Other objects will be apparent from the following specification and claims.

In the accompanying drawings which show the embodiment of the invention which I now deem preferable:

Figure 1 is a view partly in section and partly in elevation of a clutch mechanism embodying the invention.

Fig. 2 is a fragmentary sectional view similar to Fig. 1 but showing the parts in the position for causing the engagement of the teeth.

Fig. 3 is a fragmentary sectional view similar to Fig. 1 but showing the parts in the position for causing the disengagement of the teeth.

Referring to the drawings, 1 and 2 are driving elements, these preferably being co-axially mounted and in the form of gears rotatably mounted upon a main power shaft 3. These gears 1 and 2 are differently rotated, being, for instance, rotated in different directions or at different speeds in the same direction. The gears 1 and 2 are provided respectively with clutch teeth 4 and 5.

Positioned between the driving elements 1 and 2 is a driven element or sleeve 6. The sleeve 6 is axially movable and is preferably splined on the aforesaid shaft 3. The sleeve carries clutch teeth 7 and 8 which are adapted respectively to mesh with the teeth 4 and 5 on the driving gears 1 and 2.

Surrounding the driven element or sleeve 6 is an axially movable operating member or collar 9. This is provided with an annular groove 10 in which are entered rollers 11—11 carried by a forked operating lever 12. This operating lever can be mounted or controlled in any usual or preferred way and the details thereof are not shown. It is sufficient to say that by means of the operating lever and the rollers the collar 9 can be moved endwise to a limited extent to either of two extreme positions.

Interposed between the operating member or collar 9 and the driven element or sleeve 6 is a spring 13 which normally serves to hold these two parts in register as shown in Fig. 1. When the collar is moved in one direction or the other, the spring tends to move the sleeve in the same direction and to the same extent, thus carrying the clutch teeth 8 into mesh with the clutch teeth 5 or carrying the clutch teeth 7 into mesh with the clutch teeth 4. However, the tops of the teeth frequently come into contact so that the teeth do not immediately enter into full engagement. The spring permits the collar 9 to continue its movement to the extreme position and the spring afterward serves to move the teeth into full engagement as soon as the relative position thereof makes this possible. Preferably the spring 13 is a coil spring concentric with the driven element or sleeve and with the operating member or collar and positioned between them. As illustrated, the sleeve 6 and the collar 9 are formed respectively with external and internal annular grooves which register with each other to form an annular recess in which the spring 13 is located. Located in this annular recess are rings 14 and 15 each of which engages both the sleeve and the collar at the ends of the recess. In order that the rings 14 and 15 may be put in place, as shown, the sleeve 6 is formed in two parts which are connected by screws 16 and the collar 9 is formed in two parts which are connected by the screws 17. The spring 13 abuts against the rings and tends to hold them in their outermost positions. From an examination of Fig. 1, it will be seen that when the rings are in their outermost positions, the entire expansive force of the spring is normally exerted to hold the sleeve and collar in register. Relative movement can take place only by effecting a compression of the spring.

Referring to Fig. 2, it will be seen that the operating collar 9 has been moved to its extreme right-hand position but that the sleeve 6 has not moved to the same extent for the reason that the tops of the teeth 8 and 5 have come into contact with each other. However, as the result of the movement of the collar 9, the ring 14 has been moved and the spring 13 has been compressed. The spring thereafter exerts a pressure on the sleeve which serves to immediately engage the teeth 8 and 5 as soon as the relative position makes engagement possible. It will be observed that the operation is similar when the collar 9 is moved to its extreme left-hand position for the purpose of engaging the teeth 7 and 4.

In accordance with my invention I provide means for effecting a positive connection between the driven element or sleeve 6 and the operating member or collar 9 for the purpose of positively disengaging the clutch teeth when the operating member is returned from one of its extreme positions to its neutral position. Fig. 3 shows the clutch teeth 8 and 5 engaged and shows the operating member 9 returned nearly to its neutral position but not having quite reached the said position. As illustrated in this view, the assumption is that the teeth 8 and 5 are still engaged and have a tendency to stick and resist disengagement. The movement of the collar 9 toward the left beyond the position of register with the sleeve 6 serves to compress the spring and thus the full force of the spring is applied in the direction to disengage the teeth 8 from the teeth 5. In case the spring action is not sufficient to effect disengagement, a positive connection is effected between the collar and the sleeve so that the teeth are positively disengaged. This positive connection preferably consists of stops formed on the rings 14 and 15, these stops preferably being annular flanges 18 and 19 which are of such a width that they come into contact at or about the time that the collar 9 reaches its neutral position. It will be seen that when these flanges engage there is a positive non-resilient connection from the collar to the sleeve, this connection serving to start the disengagement of the teeth. As soon as disengagement starts, it is completed by the spring 13 acting in the usual way. It will be seen that the positive disengaging action is similar whether the teeth 8 and 5 be engaged or the teeth 4 and 7.

What I claim is:

1. The combination in a clutch mechanism of two differently rotating coaxial toothed driving elements, a rotatable axially movable driven element mounted between the driving elements and having two sets of teeth adapted to respectively mesh with the teeth of the two driving elements, an axially movable operating collar surrounding the driven element and concentric therewith, and a spring interposed between the driven element and the collar for resiliently connecting the former with the latter.

2. The combination in a clutch mechanism of two differently rotating coaxial toothed driving elements, a rotatable axially movable driven element mounted between the driving elements and having two sets of teeth adapted to respectively mesh with the teeth of the two driving elements, an axially moving operating collar surrounding the driven element and concentric therewith, and a coil spring surrounding the driven element and interposed between the said element and the collar for resiliently connecting the former with the latter.

3. The combination in a clutch mechanism of two differently rotating coaxial toothed driving elements, a rotatable axially movable driven element mounted between the driving elements and having two sets of teeth adapted to respectively mesh with the teeth of the two driving elements, an axially movable operating collar surrounding the driven element and concentric therewith, a coil spring surrounding the driven element and interposed between the said element and the collar for resiliently connecting the former with the latter, and means associated with the spring for causing the entire expansive force thereof to be normally exerted to hold the driven element and the operating collar in register.

4. The combination in a clutch mechanism of two differently rotating coaxial toothed driving elements, a rotatable axially movable driven element mounted between the driving elements and having two sets of teeth adapted to respectively mesh with the teeth of the two driving elements, an axially movable operating collar surrounding the driven element and concentric therewith, a coil spring surrounding the driven element and interposed between the said element and the collar for resiliently connecting the former with the latter, and two slidably mounted rings against which the springs abuts at its ends, each ring normally engaging both the driven element and the collar and the two rings thus normally serving to hold the driven element and the collar in register.

5. The combination in a clutch mechanism of two differently rotating coaxial toothed driving elements, a rotatable axially movable driven element mounted between the driving elements and having two sets of teeth adapted to respectively mesh with the teeth of the two driving elements, an operating member for the driven element, a coil spring interposed between the driven element and the operating member and resiliently connecting the former with the latter for the purpose of engaging the teeth after movement of the operating member to an extreme position, and means for effecting a positive connection between the driven element and the operating member for the purpose of positively disengaging the teeth when the operating member is returned to neutral position.

6. The combination in a clutch mechanism of two differently rotating coaxial toothed driving elements, a rotatable axially movable driven element mounted between the driving elements and having two sets of teeth adapted to respectively mesh with the teeth of the two driving elements, an axially movable operating collar surrounding the driven element and concentric therewith, a spring interposed between the driven element and the collar and resiliently connecting the former with the latter for the purpose of engaging the teeth after movement of the collar to an extreme position, and means for effecting a positive connection between the driven element and the collar for the purpose of positively disengaging the teeth when the collar is returned to neutral position.

7. The combination in a clutch mechanism of two differently rotating coaxial toothed driving elements, a rotatable and axially movable driven element mounted between the driving elements and having two sets of teeth adapted to respectively mesh with the teeth of the two driving elements, an axially movable operating collar surrounding the driven element and interposed between the said element and the collar, the said spring connecting the driven element with the collar for the purpose of engaging the teeth after movement of the collar to an extreme position, and means for effecting a positive connection between the driven element and the collar for the purpose of positively disengaging the teeth when the collar is returned to neutral position.

8. The combination in a clutch mechanism of two differently rotating coaxial toothed driving elements, a rotatable axially movable driven element mounted between the driving elements and having two sets of teeth adapted to respectively mesh with the teeth of the two driving elements, an axially movable operating collar surrounding the driven element and concentric therewith, a spring interposed between the driven element and the collar and resiliently connecting the former with the latter for the purpose of engaging the teeth after movement of the sleeve to an extreme position, means associated with the spring for causing the entire expansive force thereof to be normally exerted to hold the driven element and the collar in register, and means for effecting a positive connection between the driven element and the collar for the purpose of positively disengaging the teeth when the collar is returned to neutral position.

9. The combination in a clutch mechanism of two differently rotating coaxial toothed driving elements, a rotatable axially movable driven element mounted between the driving elements and having two sets of teeth adapted to respectively mesh with the teeth of the two driving elements, an axially movable operating collar surrounding the driven element and concentric therewith, a coil spring surrounding the driven element and interposed between the said element and the sleeve, the said spring resiliently connecting the driven element with the collar for the purpose of engaging the teeth after movement of the collar to an extreme position, means associated with the spring for causing the entire expansive force thereof to be normally exerted to hold the driven element and the collar in register, and means for effecting a positive connection between the driven element and the collar for the purpose of positively disengaging the teeth when the collar is returned to neutral position.

10. The combination in a clutch mechanism of two differently rotating coaxial toothed driving elements, a rotatable axially movable driven element mounted between the driving elements and having two sets of teeth adapted to respectively mesh with the teeth of the two driving elements, an axially movable operating collar surrounding the driven element and concentric therewith, a spring interposed between the said element and the collar and resiliently connecting the former with the latter for the purpose of engaging the teeth after movement of the collar to an extreme position, two slidably mounted rings against which the spring abuts at its ends, each ring normally engaging both the driven element and the collar and the two rings thus normally serving to hold the driven element and the collar in register, and stops formed on the rings and adapted to engage each other for the purpose of positively moving the driven element to disengage the teeth when the collar is returned to neutral position.

In testimony whereof I hereto affix my signature.

LEWIS M. PYLE.